F. W. GOEDEKE.
SAFETY CRANK CATCH.
APPLICATION FILED JULY 19, 1921.
1,429,030.
Patented Sept. 12, 1922.
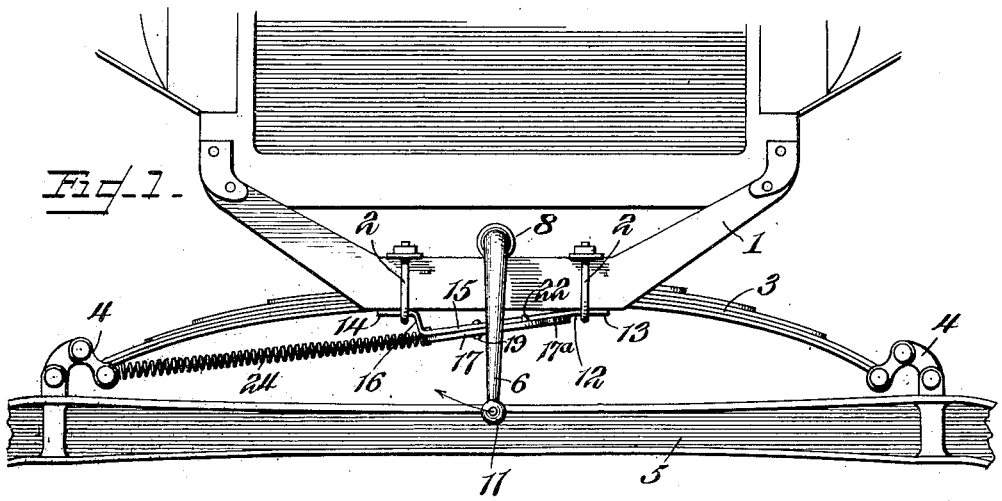
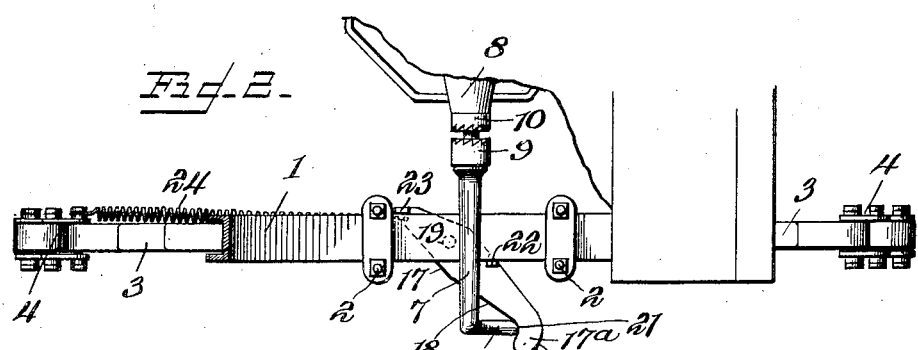
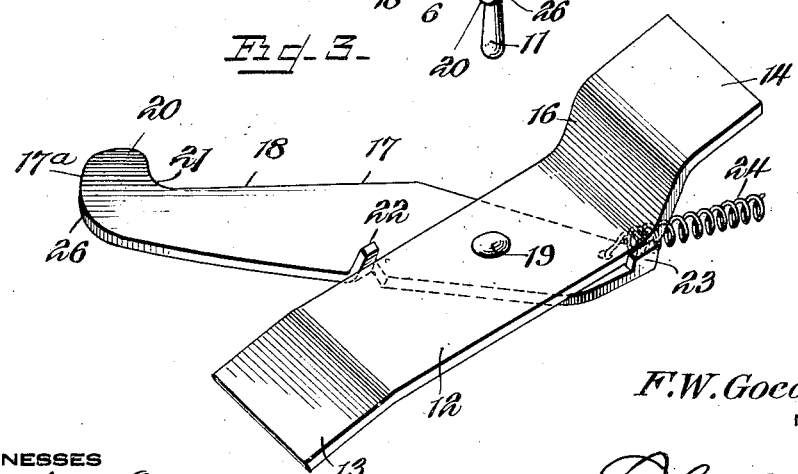
F. W. Goedeke, INVENTOR
WITNESSES Patented Sept. 12, 1922.

1,429,030

UNITED STATES PATENT OFFICE.

FREDERICK W. GOEDEKE, OF EVANSVILLE, INDIANA, ASSIGNOR OF ONE-HALF TO HERMAN MUELLER, OF EVANSVILLE, INDIANA.

SAFETY CRANK CATCH.

Application filed July 19, 1921. Serial No. 485,894.

*To all whom it may concern:*

Be it known that I, FREDERICK W. GOEDEKE, a citizen of the United States, residing at Evansville, in the county of Vanderburgh and State of Indiana, have invented a new and useful Safety Crank Catch, of which the following is a specification.

This invention relates to an attachment for preventing a reverse rotation of a crank, and is more particularly directed to a new and improved means which will prevent reverse movement, within well defined limits, of a crank adapted to manually rotate the crank shaft of an engine when the engine backfires.

It is an object of my invention to provide a new and improved device which will automatically disengage the crank from the crank shaft and thus prevent reverse rotation of the crank, when the engine backfires during an attempt to manually start the engine, whereby accident to the operator of the car in attempting to crank the same is prevented.

It has been previously proposed to employ a spring-pressed hook movable in a vertical direction to engage and abruptly stop the crank, adapted to rotate the crank shaft of an engine, at the beginning of the third quadrant of the revolution of the crank. The position of the hook relative to the crank entails considerable danger by reason of the fact that the crank arm is permitted too great a reverse movement before it is stopped, whereby the arm of the operator may be caught between the hook and the crank and broken during this extended period of reverse revolution of the crank.

I propose to construct a device which will, at all times, be capable of engaging the crank during the period of reverse revolution wherein the danger is the greatest, and by which the crank will not only be checked in its movements but will gradually be released from the crank shaft at a point where the force of the reverse revolution will be at its height, and will not interfere with the arm of the operator at any time.

Furthermore, the engaging means is in such a position where it will not be absolutely necessary to depend upon a spring to maintain said means in engagement with the crank. In the prior construction where the force of gravity was constantly acting upon the hook, a spring is not a very reliable means to maintain the hook in its elevated position. Where the engaging means is located in a horizontal position as in this device, it may be readily returned and remain in position to engage the crank in case of backfire of the engine.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Fig. 1 is a front view of the device as applied to the front member of the automobile frame to which the spring is secured.

Fig. 2 is a plan view of the device shown in Fig. 1.

Fig. 3 is a view in perspective of the device shown as detached from the frame construction of the automobile.

In the drawing, 1 designates the front cross member of the frame, which is channel-shaped, and in which channel is securely mounted, by means of clips 2, a front spring 3 supported at its outer ends by hangers 4 upon the front axle 5.

A crank 6, provided with a shaft 7, is slidably mounted in bearings 8 formed at the outer end of the crank casing. On the inner end of the shaft 7 is rigidly mounted a member 9 of a conventional dog clutch. The mating member 10 of the clutch is rigidly secured upon the outer end of the crank shaft. As the handle 11 of the crank is grasped and the shaft 7 is moved inwardly, so that the member 9 of the clutch will engage the member 10, and the crank is rotated in a direction indicated by the arrow in Fig. 1, the crank shaft of the engine will be rotated in the same direction of rotation through which the crank shaft has passed.

It frequently happens that where the spark has been advanced too far, or for some other reason back pressure is caused in one of the cylinders, forcing the piston in a direction opposite to that in which it has just been moved, before it has completed its stroke, the rotation of the crank shaft and likewise the crank is reversed.

Since the operator has a firm grip on the handle 11 of the crank, the shaft 7 and the crank 6 being rotated in a manner which is reverse to the direction in which he has rotated the crank, the sudden change of rotation will often result disastrously to the operator, frequently causing a breakage of some of the bones in his wrist, arm or fingers. It therefore becomes necessary to eliminate this danger. To this end, I have devised a means which will not only prevent the crank 6 from rotating in a reverse direction, but which will force the crank outwardly to disengage the members 9 and 10 of the dog clutch.

A plate 12 is secured at its free ends 13 and 14 to the under side of the spring 3 by means of the clips 2. The middle portion 15 of the plate is inclined at an angle to the horizontal plane passing through the outer ends 13 and 14 of the plate through the provision of an offset portion 16 which spaces that end of the plate which is near to the end 14 from the spring 3.

A lever or dog 17, constructed of a flat piece of metal, is provided with the inclined cutaway portion or edge 18 and is pivoted at 19 upon the inclined portion 15 of the plate 12, which causes the dog to assume the same angle as the plate. The inclination of the dog 17 permits the outer free end 17ᵃ of the dog to move in a plane which is inclined at an angle to the horizontal plane passing through the pivotal point of the dog, thus giving to the end 17ᵃ two different positions of adjustment; that is to say, when the dog is swung inwardly and is lying contiguous to the plate 12, the end 17ᵃ is lower than the pivotal point of the dog, and it is higher than said pivot, when the dog is extended outwardly from the front of the frame.

Upon the outer free end 17ᵃ of the longer arm of the dog 17 is formed a hook-shaped projection 20, which, together with the inclined portion 18, forms a socket 21 in which the crank 6 is adapted to be seated at certain times. Between the pivotal point 19 and the end 17ᵃ, and upon the edge opposite to the inclined edge 18, is formed an upstanding lug 22 which is so placed in the path of a side edge of the part 15 of the plate 12 that it will engage said edge at the same time that a lug 23 on the inner end of the lever will engage the opposite side edge of the part 15 of the plate 12, and thus limit outward movement of the pivoted dog 17. The inner and shorter end of the lever is perforated, through which perforation is inserted a connection for a spring 24. The other end of the spring is secured to any portion of the vehicle, but as shown in Figs. 1 and 2, it is secured to the spring shackle 4. The mounting of the spring is not material.

The spring tends to maintain the dog 17 extended outwardly and in a position to be in the path, at all times, of the crank 6, when said crank is rotated in either direction. If the crank is rotated in a direction to start the engine, as indicated by the arrow in Fig. 1, the crank will engage the rear of the dog 17, and bearing upon the same will force the dog inwardly against the tension of the spring 24 until the crank will have passed the rounded back portion 26 of the dog, when the spring will again return the dog to its normal outward position shown in Fig. 2. If the crank should be rotated as by back fire in a cylinder, in a direction which is reverse to the direction indicated by the arrow in Fig. 1, the crank will be engaged by the inclined edge 18 of the dog 17, and by reason of the inclination of said edge, the shaft 7 will be gradually forced outwardly and the members 9 and 10 of the clutch will be disengaged, thereby preventing any further reverse rotation of the crank.

Because of the end 17ᵃ of the dog being normally located in a more elevated position than the pivotal point 19 of said dog, it must be recognized that the crank will not be stopped abruptly, and no sudden shock or strain will be thrust upon the crank, the engine shaft, or upon the arm of the operator, since the crank, in its reverse rotation, is gradually moved outwardly along the inclined edge 18 of the dog, until it is seated within the cavity 21 of the hook 20. At this time, the dog clutch will be entirely disengaged.

The lugs 22 and 23 always engage opposite edges of the inclined part 15 of the plate, when the dog 17 is in either of its extreme positions of movement.

If at any time the spring 24 should become weak or broken, the plate 17 can be placed by hand to its normal position and the engine started by short upward movement of the crank in the direction shown by arrow in Fig. 1, and should the engine backfire or the direction of the crank be reversed during this operation, the crank would slip from the operator's hand and be caught by the hook or socket 21, in the same manner as previously described, and the function of the device would not be impaired.

What is claimed is:—

1. A safety crank catch for automobiles, comprising a yieldable dog pivoted for movement in a substantially horizontal plane and in the path of the crank, the free end of the dog being adapted to be moved by the normal operation of the crank between points which lie upon opposite sides of the normal vertical position of the crank, the crank passing beyond the free end of the dog at one of said points, and means for automatically returning the dog to the other point in its limit of travel, said dog adapted to stop the reverse movement of the crank at this last-named point.

2. A safety crank catch for automobiles, comprising a plate disposed at an angle to the horizontal, a dog pivoted on said plate and also disposed at an inclination, and adapted to be oscillated by the operation of the automobile crank between points lying upon opposite sides of the normal vertical position of the crank, said dog yieldingly permitting the crank to pass beyond the free end of the dog at one of said points, and means for returning the dog to the other point in its limit of travel, the free end of the dog when in engaging position being located in a plane above the pivotal point of the dog, the dog in this position stopping reverse rotation of the crank and forcing the same out of operative position.

3. A safety crank catch for automobiles, comprising a yieldable dog pivoted for movement in a substantially horizontal plane and in the path of the crank, the free end of the dog being adapted to be moved by the operation of the crank between points which lie upon opposite sides of the normal vertical position of the crank, the crank passing beyond the free end of the dog at one of said points, means for automatically returning the dog to the other point in its limit of travel, said dog being adapted to stop the reverse movement of the crank at this last-named point, and means to limit the movement of the dog.

4. In combination with a motor vehicle provided with a frame, a spring, clips securing the spring to the frame, a crank, and means for preventing reverse movement of the crank, comprising a plate inclined at an angle to the horizontal plane passing through the frame, said plate being secured at its ends to the frame by said clips, a dog pivoted between its ends on the plate and inclined at an angle to the horizontal plane passing through the points of attachment of the plate to the frame, a spring connected to the dog to force the outer end of said dog outwardly from the frame, a hook on the end of the dog adapted to engage the crank and prevent movement of said crank in one direction, the inclination of the dog tending to hold the dog outwardly from the motor vehicle, and means for limiting the movement of the dog.

In testimony that I claim the foregoing as my own, I have hereto affixed my signature.

FREDERICK W. GOEDEKE.